Aug. 3, 1965     G. A. WALLEY     3,197,903
DEAD FRONT DISPLAY
Filed May 28, 1963
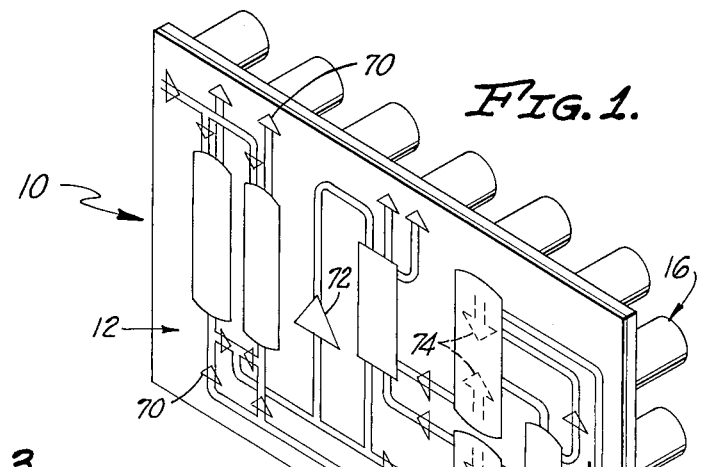
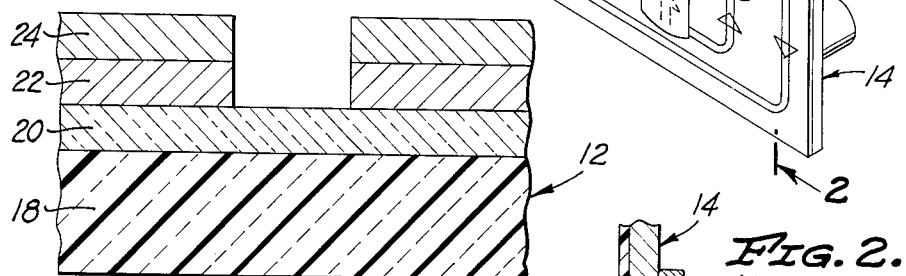
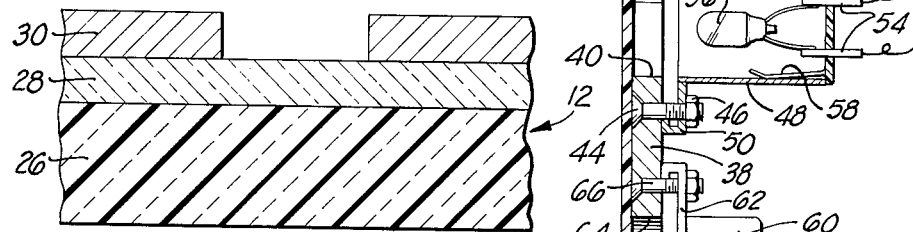
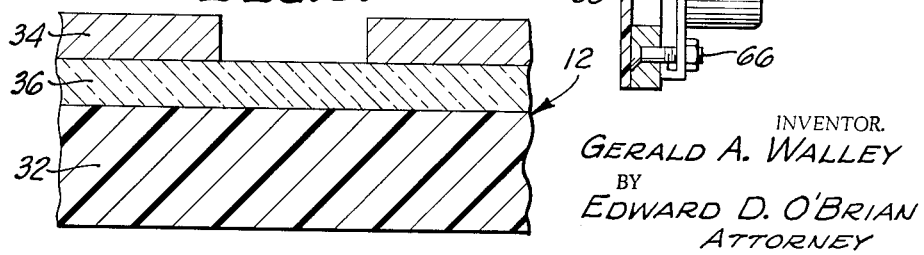
INVENTOR.
GERALD A. WALLEY
BY
EDWARD D. O'BRIAN
ATTORNEY 3,197,903
DEAD FRONT DISPLAY
Gerald A. Walley, 6320 Salter Ave., Temple City, Calif.
Filed May 28, 1963, Ser. No. 283,842
1 Claim. (Cl. 40—130)

This invention is directed to a dead front display.

Man's civilization on this earth is dependent upon the transmittal of information from one individual to another. Communication between the individuals of mankind is essential in all relations between man. While man has five senses, nearly all intelligence is transmitted by audio or visual means. Indeed, between these two receptors of information, man acquires most of his information, and does most of his communication through visual means. Most advertising is visual and is done by the printed word and suitable illustrations in magazines, on billboards and on television. Communication of more technical intelligence is done by books, technical reports and displays of graphic or pictorial types. Accordingly, clarity of communication through the visual channels is necessary for the advance of civilization. Mistakes, or delays in the receipt of information slow down the acquisition of knowledge and delay progress.

In recent years there has been an effort to expand the transmission and receipt of visual information beyond the traditional ways which have been historically used. Traditionally the written word, the photograph, the drawing and the graph have transmitted by far the greatest amount of technical information. The need for improving such transmission is foreseen and consideration has been given to improve methods of communication.

Accordingly, it is an object of this invention to provide a dead front display which clearly and concisely presents information to a visual observer.

It is another object of this invention to provide a display means for information which displays only the pertinent information to the subject being considered at that time, and changes the display of pertinent information as study of the subject proceeds.

It is another object of this invention to provide a dead front display device which can be easily manufactured so that different displays can be provided with economy.

Further advantages of this invention will become apparent upon study of the following specification, the claim and the attached drawing, in which FIG. 1 is an isometric view of an exemplary dead front display unit;

FIG. 2 is a section taken along the line 2—2 of FIG. 1 showing details of a portion of the display thereof;

FIG. 3 is a schematic section of one embodiment of the front panel of the display of FIG. 1;

FIG. 4 is a schematic section of another embodiment of the front panel; and

FIG. 5 is a schematic section of yet another embodiment of the front panel.

In summary, this invention relates to a dead front display device for conveying visual information. It comprises a panel which carries various information which is normally invisible to the observer and illumination means to make visible selected information. The panel may carry fixed information which is visible under any conditions of rear illumination, and the panel includes information which is selectively illuminated and selectively visible to the observer. This selectively observable information is provided by using a translucent panel portion which appears opaque without back illumination, and an opaque portion on the rear thereof outlining the information to be transmitted. Information transmission occurs when rear illumination lights the opaque and translucent areas and only the translucent areas transmit light. Accordingly, the message is visible from the front of the dead front display. By using selective illumination behind various portions of the translucent information areas, individual portions of such information may be lighted without lighting adjacent, translucent information. Accordingly, the information conveyed is selective in accordance with the selected illumination means. The invention further provides specific illumination means which is one embodiment of suitable means for providing the necessary selective illumination, and this means includes a lamp holder which is secured to the rear of the display at each information bit to be illuminated. Further utility is provided to the display by furnishing a resilient surface which is able to be deformed and depressed sufficiently far as to cause actuation of elements there beneath. Switches may be located under various areas of the display, and these switches can be actuated by pressing on the front of the display panel.

A more detailed understanding of the invention will be had on reference to the attached drawings. In FIGS. 1 and 2 therein the dead front display panel is generally indicated at 10. The display is comprised of a plastic front 12 which carries the information, a supporting structure 14 which supports the plastic front 12 and the illumination and other equipment 16.

The plastic front may be made by several different methods and accomplish the above described functions. Referring now to FIG. 3, one such plastic front is illustrated therein. It comprises a polyvinylchloride sheet of substantially rigid nature and is unpigmented to be transparent. This sheet is identified by the numeral 18 and is preferably 0.010 inch to 0.030 inch thick for the reasons discussed below. One surface of this plastic is planished to provide a non-glare surface. Other surface finishes may alternatively be used so long as they provide a matte, non-reflecting surface. This finished surface is considered the front of the transparent plastic sheet 18 for it is the side toward the observer. In some circumstances other materials than plastic may be used, and where complete rigidity is desirable, glass with a lightly sand-blasted front surface is feasible.

When the basic color has been determined, translucent spray material is made of the opaque pigment corresponding to the desired color mixed with a clear resin paint. This material is silk screened or sprayed all over the rear of the transparent plastic sheet 18 and makes up a translucent, colored layer 20. The clear resin and the opaque pigment therein are of such nature as to dry into a hard film. In the next step, a mask is applied to the rear surface of the translucent layer 20. Such a mask may be sprayed on or may be applied as an overall sheet of material. The mask is cut and the area which is to be further sprayed has its mask peeled away. Alternatively, the mask could be sprayed through patterned aperture or could be silk screened onto the areas where futher material application is undesired. In any of these cases, the area which is masked will ultimately be translucent, and the unmasked area will be opaque so that the mask determines the shape of the information bit which will appear as lighted translucent color.

Thereupon, an opaque color which is comprised of the same opaque pigment in greater density in its paint-like vehicle is sprayed all over the back surface. Such a layer is indicated at 22. Optionally, a more opaque material such as an opaque black or an opaque aluminum pigment in appropriate vehicles may be additionally sprayed over the entire back of the transparent plastic display panel. This improves the opacity of the areas where it is not desired that light be transmitted. Such additional, optional opaque layer is identified by numeral 24. After the opaque layer or layers are applied and dried, the mask is removed to bare the translucent information bit.

Other similar methods of producing a translucent bit of information in an opaque background of the same color are available. In similar manner to that described above, the plastic front 12 of FIG. 4 is made of transparent, rigid polyvinylchloride plastic sheet 26 in the thickness range of approximately 0.010 inch to 0.030 inch which has a planished, or similar, front surface. In this case a layer 28 of a translucent color is silk screened or sprayed all over the back of the plastic sheet 26. This translucent color is similar to the one described above, where an opaque pigment is diluted in a clear resin to provide a translucent paint-like coating 28. In the embodiment of FIG. 4, an opaque color layer 30 is silk screened on the back of the translucent color layer 28. This opaque color is made by mixing the same pigment in such density in a vehicle as to provide a substantially opaque layer 30. The layer 30 may be sprayed around a suitable physical mask held in place during the spraying operation. It can be seen that the structure of FIG. 4 also provides a unit which has a single color appearance when it is not back lighted, and provides a bright information bit through the non-opaque area when back lighting is applied.

In the further embodiment of FIG. 5 of the plastic front 12, the plastic layer 32 is of translucent polyvinylchloride having a planished front surface. Translucency is imparted to the plastic layer 32 during its manufacture by inclusion of a pigment therein. This pigment may be white or may be another color depending upon the color task to be accomplished by the display. The amount of pigment in the plastic layer 32 depends on the particular pigment, the thickness of the plastic layer 32 and the translucency desired. These factors are each variable, and the most appropriate values are determined for the particular application. In this embodiment, white translucency is preferred in the plastic layer 32, and an opaque layer 34 is applied to the back thereof to opacify the areas which are not to be seen from the front. Thus, the opaque layer 34 outlines the information bit to be observed on the front. The opaque layer may be silk screened in place, or sprayed around a mask, and may be opaque black, opaque aluminum or some other suitable opaque color. As an optional, alternative feature in some cases it is considered desirable to spray a translucent color layer 36 all over the back of the plastic layer 32 before the application of the opaque layer 34. Thus, if the plastic layer 32 is a white translucent character, and the translucent color 36 applied thereto is red, the front will appear white until rear illuminated. When illuminated from the rear, the light will be filtered through the translucent layer 36 and the red indication will appear at the viewing side of the plastic layer 32. The same result may be accomplished by applying a color filter to the illuminating lamp, as will be hereinafter described.

The plastic front 12 has pressure sensitive adhesive on the rear thereof, and then it is applied to the supporting structure 14, for physical support. As seen in FIG. 2, the plastic front 12 is adhesively secured to the front of an aluminum plate 38 which in turn has additional supporting structure to support the whole dead front display in its environment. Aluminum is preferred for the plate 38 because of its ease of machineability, but other materials either of plastic or metallic material can be used in this application. Behind each of the information bits applied to the sheet 12 by the means indicated above and illustrated in FIGS. 3, 4, and 5 there is a hole 40 in the plate 38. Behind each hole 40 is a lamp housing 42 which is secured to the plate 38 by means of screws 44 which are flush with the front of the plate 38 and pass therethrough. Nuts 46 secure the lamp housing 42 on the screws 44. Alternatively to the screws 44, studs could be screwed part way through the plate 38 or secured by welding the rear surface thereof. The lamp housing 42 comprises a lamp tube 48 mounted on mounting feet 50. The feet 50 hold the lamp tube 48 away from the rear surface of the plate 38 to permit ventilation and eliminate heating of the plastic sheet 12 by the lamp within the lamp housing. The lamp tube 48 carries a lamp base which may be a plastic insulating disc 52 having conductor pins 54 passing therethrough. A lamp 56 has its supply wires secured to the conductor pins 54 and the lamp 56 is physically supported thereby. In turn, the insulating disc 52 is supported within the lamp tube 48 by means of spring fingers 58 engaging on the interior thereof. The entire interior of the lamp housing is preferably painted with white paint, or otherwise highly reflective surface to decrease heating and to improve light transmission to the rear of the plastic front 12. If desired, a filter is applied across the front of the lamp tube 48 to cut down on the amount of light impinging upon the front 12, to equalize the illumination of various bits of information thereon. Furthermore, color filters can be used in that location to equalize color or change color as is desired for the particular application. The conductor pins 54 are connected to a suitably controlled supply of electric current.

If desired, the surface of the plastic front 12 can also be depressed to actuate a switch therebeneath. Structure suitable to accomplish this function is seen in FIG. 2 wherein a sensitive switch 60 is mounted upon a suitable supporting bracket 62 which is in turn mounted over a hole 64 in the plate 38. Screws 66 hold the bracket 62 in place. The plastic front 12 is of such resiliency, and the hole 64 is of such size that depression of the plastic front 12 actuates the actuating finger 68 of the switch 60, to actuate the switch 60. The switch 60 is suitably wired into the circuit to accomplish the function desired of it.

Referring again to FIG. 1, it is seen that the display shown therein has a chemical plant schematic diagram indicated thereon. This diagram can be applied to the back of the plastic sheet by silk screening or suitable masking before the application of the translucent color, as indicated with respect to FIGS. 3 and 4. Accordingly the diagram would appear against the background translucent color. When the bits of information outlined by the opaque back layer are applied in correct position, they can indicate all manner of things with respect to such a diagram. For example, arrows 70 can indicate when illuminated the action of the reversing regenerator shown at the left hand side of the schematic flow sheet. Similarly, illumination of the expander 72 can indicate that the expander is in operation. Similarly, arrows 74 can indicate vapor and liquid flow in the distillation columns indicated.

All manner of different bits of information can be illustrated on such a dead front display, and only the information pertinent to the particular circumstances is illuminated. When not illuminated, it is not visible and therefore no distracting, non-pertinent information is seen.

In chemical engineering schematic flow sheets, the operation of valves, pumps, heaters, reboilers, distillation columns, heat exchangers, filters, compressors, blowers, heating fires, and other appropriate elements can be indicated as being active by illumination of the correct replica. Similarly, electrical schematics can be illustrated by the instant dead front display. Additionally, other discrete information bits can be indicated. Numerical values can be applied to the plastic front so that only the specific value of particular importance is visible to the person observing the display. In other words, only the correct value appears before the person taking data from the display, and therefore errors are obviated. Such a display is also useful in those cases where an operator must make adjustments to a plurality of different controls depending on particular circumstances. In such a case it would be appropriate to have electrical circuit means associated with the conductor pins 54 which includes selection of the correct lamp in accordance with a preplanned arrangement. For example, punched cards would establish one pattern of illumination to establish an information display needed for a first purpose, while another card would display information for a second purpose. Accordingly, patterning of illumination, and progressive illumination to present discrete bits of information is feasible in accordance with the energizing system. The energizing system is not described in detail, for it is dependent on the character of the display front and the manner in which it is to be operated. Sequential information for the understanding of a flow sheet, or similar schematic, could be arranged by a program timer, while a wider range of variables is presented by a punched card or similar system.

It is apparent from this disclosure that numerous modifications and alternatives are available to the routine engineer, whereby he can obtain all the advantages of this invention. Accordingly, the scope of this invention is defined by the following claim.

I claim:

A dead front display device, said dead front display device comprising:
- a polymer composition front layer having a front surface and rear surface, said front surface being adapted to be positioned so as to be visible, said polymer composition front layer being flexible and being capable of transmitting light therethrough from said rear surface through said front surface, said front layer having a thickness between substantially .010 and .030 inch, said front surface of said front layer being free of applied material and being treated in such a manner as to be substantially uniformly non-reflective, said front surface being smooth except for its non-reflective character and being arranged to be directed toward a viewer;
- a continuous, substantially uniform layer of translucent color applied to the entire rear surface of said front layer;
- a layer of opaque material selectively arranged upon the rear of said translucent color layer in such a manner as to outline bits of information;
- a perforated support having a front side and a rear side, said perforated support being secured to said front layer adjacent the rear surface thereof with the front side of said support directed toward the rear surface of said front layer, a plurality of openings in said perforated support, said openings being positioned with respect to said bits of information so that light passing through one of said openings illuminates one of said bits of information;
- a plurality of lamp means secured to said perforated support on the rear side thereof, each of said lamp means being associated with one of said openings in said perforated support, each of said lamp means comprising a lamp tube, each of said lamp tubes having a front end and a rear end, each of said lamp tubes having a flange on the front end thereof, and flanges being secured to said perforated support so as to space said lamp tubes away from said perforated support so that air may circulate between each of said lamp tubes and said perforated support so as to cool the interior of each of said lamp tubes, a lamp in each of said lamp tubes, each of said lamps being removable from the rear end of its respective lamp tube, said lamps being arranged so that upon illumination of any one of said lamps, said adjacent portion of said translucent color layer non-opacified by said opaque layer is illuminated and the light produced by said lamp is visible at the front surface of said front layer while bits of information corresponding to non-illuminated lamps are invisible from the front of said front layer.

References Cited by the Examiner

UNITED STATES PATENTS

| | | | |
|---|---|---|---|
| 1,157,856 | 10/15 | Eubank | 40—133 |
| 1,389,365 | 8/21 | Kline | 40—132 X |
| 1,648,977 | 11/27 | Weidner | 40—135 |
| 1,888,584 | 11/32 | Cadieux | 40—133 |
| 2,104,280 | 1/38 | Spratley | 40—135 |
| 2,737,559 | 3/56 | Shalma | 40—130 X |
| 3,010,235 | 11/61 | Roberts | 40—132 |

FOREIGN PATENTS

| | | |
|---|---|---|
| 1,259,082 | 3/61 | France. |

EUGENE R. CAPOZIO, *Primary Examiner.*

JEROME SCHNALL, *Examiner.*